Jan. 21, 1941.                G. ALFIERI                2,229,162
              CONTROL DEVICE FOR FLUID PRESSURE PLANTS
                   Filed Oct. 5, 1938         3 Sheets-Sheet 3

Patented Jan. 21, 1941

2,229,162

UNITED STATES PATENT OFFICE 2,229,162

CONTROL DEVICE FOR FLUID PRESSURE PLANTS

Giuseppe Alfieri, Milan, Italy, assignor to Fabbrica Italiana Magneti Marelli Società Anonima, Milan, Italy, a corporation of Italy Application October 5, 1938, Serial No. 233,507
In Italy October 13, 1937

8 Claims. (Cl. 137—153)

This invention relates to compressed air plants including a compressor and a reservoir fed by said compressor such as embodied in pressure air operated brakes for vehicles, and has for its object a control device which operates to efficiently connect the compressor with atmosphere when air pressure in said reservoir reaches a predetermined value the compressor then operating idly.

This invention also includes other features and advantages and means by which air may be obtained from said compressor under a pressure higher than the said predetermined pressure.

An embodiment of the present invention is shown by way of example on the annexed drawings and Fig. 1 is a transverse section of a device according to this invention on broken line 1—1, Fig. 4;

Fig. 4 is a plan view with parts in section on line 4—4, Fig. 1.

Figure 1:
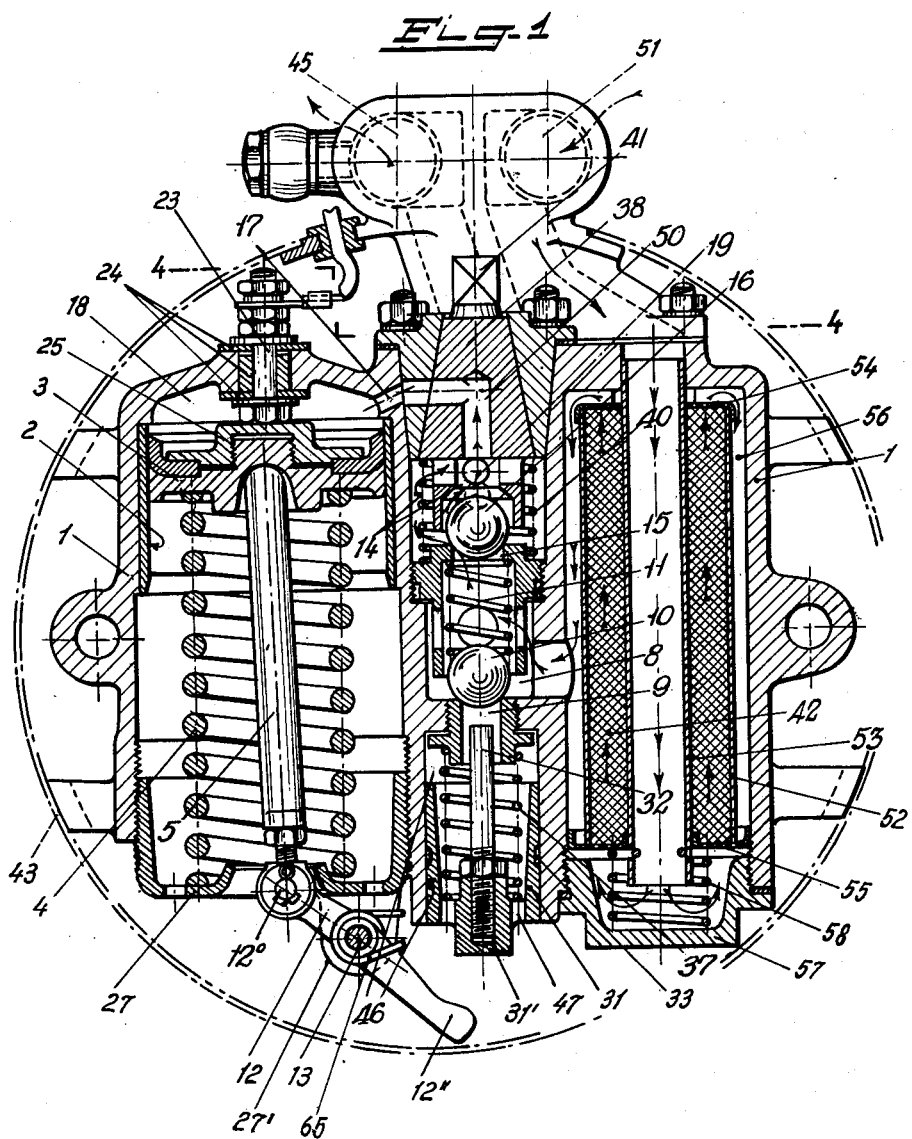

The control device of this invention is intended to be affixed on a compressed air reservoir shown diagrammatically by one of its walls by 62 and to control the communication of the outlet of an air compressor with said reservoir to supply compressed air therein until a predetermined pressure prevails therein and then to connect the compressor outlet with atmosphere to discharge the air fed by said compressor after the desired pressure has been obtained in the cooperating reservoir; said device also provides means for drawing compressed air directly from said compressor at its full operative pressure when desired, as above stated.

The control device includes a casing 1 in which a cylinder 2 is provided and a piston 3 is mounted to reciprocate in said cylinder; a spring 4 has one end abutting on the cylinder bottom 27 and acts on said piston to restore it at the top end of cylinder 2.

The piston 3 loosely abuts on a stem 5 extending through an aperture of the cylinder bottom 27 and is pivotally connected at 12° with a two-arm lever 12, 12″ fulcrumed at 13 on a depending extension 27′ of said cylinder bottom 27.

A contact member 25 is provided on the top face of the piston 3 to cooperate with a contact 23 mounted on the cylinder head by means of insulating parts 24; the two contacts 25 and 23 are inserted in an electric circuit including a source of electric current and an indicator, not shown, to give an alarm at the time the air pressure in the reservoir is dropped to a low predetermined value.

A chamber 8 is provided in the casing 1 adjacent to the cylinder 2 and said chamber 8 is connected through an air filter hereinafter described with a duct 51 adapted to be connected with the output duct of a compressor, said connection being made through a path including the space 56, a perforated head 54, an air pervious layer 42, a perforated head 55 and the passage through a hollow part 53.

A blow out port 9 leads from chamber 8 to atmosphere through a chamber 46 and ports 47 and is controlled by a ball valve 10 seated by a spring 11 to close said port 9.

Figure 3:
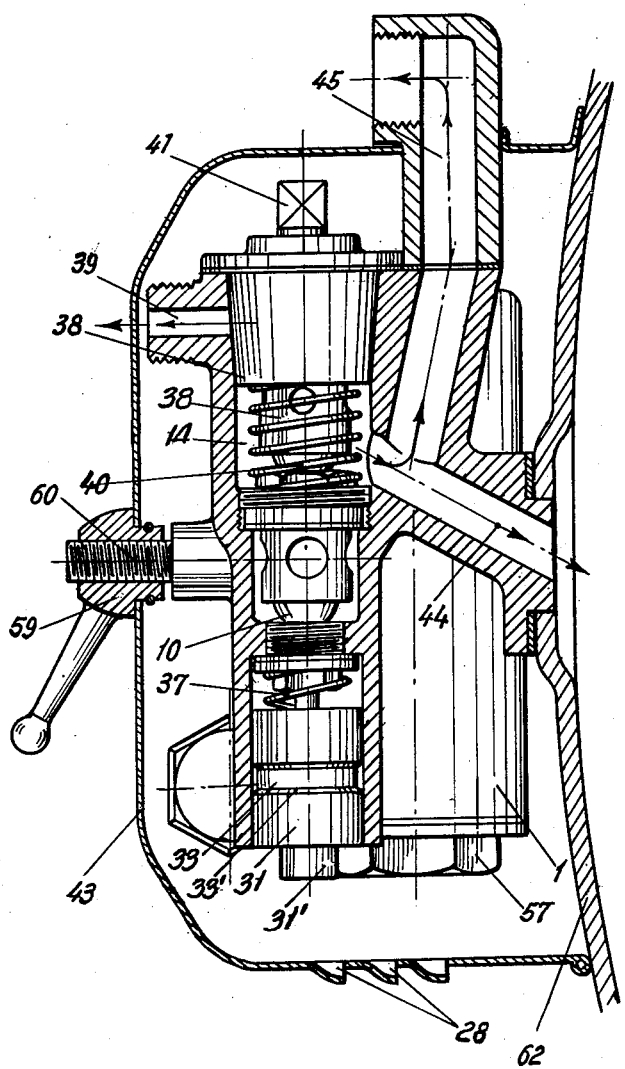
Fig. 3 is a section on line 3—3, Fig. 4.

The casing 1 includes a further chamber 14 which is connected through a duct 44 (Fig. 3) with the compressed air reservoir 62; a further duct 45 leading from the chamber 14 provides for connection with the system, as a brake plant, to be supplied with compressed air under the control of the described device.

A passage 50 and a port 17 further connect the chamber 14 with the space 18 intermediate the piston 3 and the top head of the cylinder 2. The chamber 14 is further connected with the chamber 8 through a port 15 under the control of a return ball valve 16; the valve 16 is normally held in its cutting off position when the compressor is inoperative by air pressure acting thereon from reservoir 62 through 44 and 14 and at the time the compressor is operative said valve 16 is removed from its seat by the air conveyed by the compressor to the chamber 8 this air then cooperating with the spring 11 to hold the blow out valve 10 on its seat.

A finger 32 fast on a plunger 31 mounted to slide in a bore 46 provided in a portion of the casing 1 and extending in a direction parallel with the cylinder 1 is adapted to act on the valve 10 to open it, and said plunger 31 has a head 31′ in front to the arm 12″ of the lever 12, 12″ which as above described is pivotally connected with the stem 5 of the piston 3. The plunger 31 has outlet ports 47 and is biased to the illustrated position by a spring 37 operative on said plunger 31 and on a part stationary in the casing 1.

Figure 2:
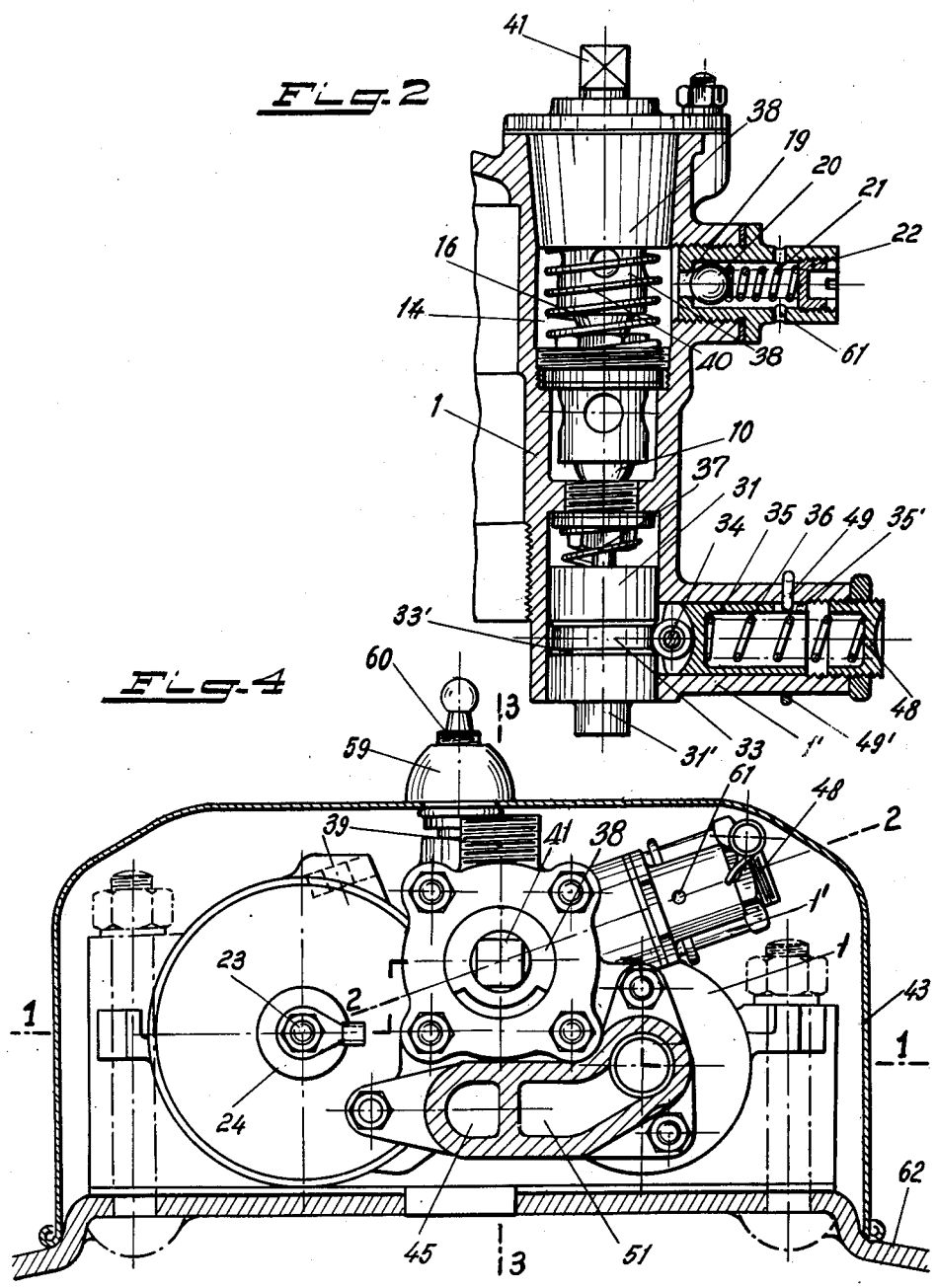
Fig. 2 is a section thereof on line 2—2, Fig. 4.

A groove 33 (Fig. 2) is provided in the side surface of the plunger 31 and is confined by bevel surfaces as 33′ and a roller 34 engages said groove; the roller 34 is carried by a plunger 35 mounted to reciprocate in a direction perpendicular to the axis of the plunger 31 in an extension 1′ of the casing 1 and a spring 36 bearing on a plug 48 is operative on said plunger 35 to hold the roller 34 thereof engaged with the groove 33. An extending end 49' of a split resilient ring 49 embracing the extension 1' projects through an aperture of said extension 1' and enters a slot 35' of the plunger 35 to prevent the plunger 35 and roller 34 thereof from rotating about the plunger axis. The finger 32 has such an extent as its tip is at a material distance from the valve 10 at the time the plunger 31 is in its position by which the roller 34 is engaged in the groove 33.

The duct 50 for connecting the chamber 14 with chamber 18 in the cylinder 2 is provided in a conical plug 38, angularly adjustable in a cooperating seat provided in the casing 1 and forced thereon by air pressure and by a spring 40; said plug 38 may be manipulated from outside for its angular adjustment by means of a handle not shown adapted to be engaged when required on a square end 41 thereof; the plug 38 may thus be shifted from the illustrated position in which the duct 50 thereof connects the chamber 14 with port 17 and space 18 of the cylinder 2 into another position in which the interconnection of chamber 14 with space 18 is cut off and said duct connects the chamber 14 directly with an air outlet 39 (Figs. 3 and 4) having means for connecting a delivery pipe, as a hose, thereto.

The device further includes a safety valve 30 (Fig. 4) having its seat provided in an outlet 19 from the chamber 14 and comprising a valve ball 20 loaded by a spring 21 which is adjustably supported by a plug 22; the flow from the chamber of valve 20 into the atmosphere occurs through ports 61.

The air filter located intermediate the chamber 8 and duct 51 connected with the air compressor consists of a layer 42 of air pervious material located intermediate two sleeves 52 and 53 and two perforated heads 54, 55; the whole is located in the central portion of a chamber 56 of the casing 1 and is held in position by a removable plug 57 and an intermediate spring 58.

A hood 43 having outlets 28 covers the device and is held in position by a handle nut 59 screwed on a bolt 60 extending from casing 1.

In operation assuming the plug 38 in its position illustrated in Fig. 1 with its duct 50 connecting the casing chamber 14 with the space 18 of the cylinder 2, the compressed air supplied from the compressor through the duct 51 enters the chamber 8 after having passed through the filtering material 42 said air flowing through duct 51, the space inside the sleeve 53, perforated head 55, air-pervious filtering material 42, perforated head 54 and the outer annular portion of the chamber 56 as shown by arrows.

Said air, while holding the valve 10 closed in cooperation with the spring 11, removes the valve 16 from its seat and enters the chamber 14 to flow to ducts 44, 45 and hence to the reservoir 62. At the same time a portion of said air flows through the duct 50 and port 17 into the chamber 18 where it causes the piston 3 to move off from the cylinder head and holds it spaced from said head against the pressure of the spring 4, the lever 12, 12" being thus oscillated anticlockwise at an angle with respect to its position in Fig. 1.

On the air pressure increasing in the space 18 of the cylinder 2, after a certain displacement of the piston 3 and stem 5 corresponding with the distance intermediate the end of the arm 12" of the lever 12 and the head 31' of the plunger 31, said piston 3 is restricted from further motion by the lever arm 12" abutting on the plunger 31, 31' which in turn is restricted from motion by the engagement of the roller 34 in the groove 33 thereof. A high pressure may thus build up in the space 8, 14, 18 because the blow out valve 10 is held seated.

As soon as the over pressure thus building up in the chamber 18 goes over a predetermined value, the action the parts 3, 5, 12, 12" develop on the plunger 31 is sufficient to overcome the motion-restricting action of the roller 34 and spring 36. Then the plunger 31 by the action the tapering bottom end surface 33' of its groove 33 exerts on the roller 34 and plunger 35 causes said roller 34 to recede and is driven to strike a violent impact on the valve 10 under the action of the piston 3 which suddenly takes its position corresponding with the balance of actions of the high pressure operative in the chamber 18 and of the opposed pressure the spring 4 applies thereto. The above defined position is materially beyond the position in which the piston 3 was restricted by the plunger 31 and cooperating parts 34, 35, 36 the valve 10 being thus carried positively by the impact applied thereto by the finger 32 into a position materially spaced from its seat. The momentum of the plunger 31, 31' and finger 32 materially cooperates with the described action in that said parts engage the valve 10 after they have taken up a material speed.

In the above described conditions the action developed by the piston 3 on the valve 10 cannot drop immediately by effect of the pressure fall in space 8, 14, 50, 17, 18 occurring when the valve 10 begins to open as it would happen should the piston 3 act directly and gradually on the valve 10; on the contrary the valve 10 is carried into a fully open position by the described operation and a large connection of the inlet duct 51 through which compressed air is supplied by the compressor is provided with the atmosphere through 51, 53, 42, 56, 8, 46, 47 while the valve 16 closes under pressure from 62, 44, 14 to cut off the reservoir 62 from blow-out outlet 47. Accordingly the reservoir 62 is cut off from the compressor and no back pressure is operative on the compressor as soon as a predetermined rate of operative pressure obtains.

The described operation depends upon two factors, that is, on the overpressure which temporarily builds up in the chamber 18 and on the momentum the system 31, 31', 32 has at the time the engagement of roller 34 with the plunger 31 is removed and the piston 3 is abruptly released to move under the action of said overpressure.

On the pressure falling down in chamber 14 and consequently in chamber 18, the springs 4, 37 and 11 restore the piston 3, plunger 31 and valve 10 into their normal positions shown in Fig. 1; the plunger 31 is thus again engaged by the roller 34 in the illustrated position, the blow out valve 10 is closed and the air supplied by the compressor may open the valve 16 and flow into the reservoir.

When the pressure within chamber 18 falls down to such a degree as the piston 3 is carried by the spring 4 at the end of its stroke, the contacts 23 and 25 engage each other to close an alarm circuit as above described and give an indication as to the pressure within the reservoir having dropped under a predetermined value.

As above described the communication of the chamber 8 with the port 17 opening into the chamber 18 occurs through the duct 50 provided in the plug 38 which may be adjusted from outside. When the plug 38 is manually adjusted to its position in which its duct 50 registers with the air supply outlet 39, the control means 3, 4, 5, 12, 31, 10 are cut off from their operation under the action of the compressed air and compressed air at the compressor delivery rate and pressure may be obtained from the outlet 39, the path for said compressed air being as follows: duct 51, filter 42, chambers 56, 8, 14, duct 50 and outlet 39.

Accordingly compressed air at a pressure independent of and over that adjusted for by the control device in the reservoir 62 may be derived directly from the device; said over pressure air may be of advantage for inflating the vehicle wheel pneumatic tires or for other purposes.

The communication of the supply duct 51 with either outlets 44, 45 or 39 always occurs through the filter 42 and accordingly such foreign matters as may be conveyed by the air fed by the compressor may be prevented from reaching the means supplied with compressed air.

The whole device has a comparatively small overall size and it may be affixed directly on the cooperating reservoir 62; further the device is protected by the hood 43 which may be easily removed by the removal of the nut 59.

What I claim as my invention and desire to secure by United States Letters Patent is:

1. For a compressed fluid plant including a fluid compressor and a compressed fluid reservoir, a pressure control device comprising a compressed fluid inlet duct leading to said reservoir, a non-return check valve in said duct, a blow-out valve in said duct ahead of said non-return valve, a part adapted to actuate said blow-out valve for opening it, said part having a side recess, a spring loaded member movable on a line transverse to the path of said part in its valve-actuation motion, said member releasably engaging said part by entering said recess thereof, a cylinder connected with said reservoir, a return spring loaded piston operative in said cylinder under the fluid pressure in said reservoir and cylinder, and means imparting the action of said piston to said part for releasing it from said engaging member and subsequently driving said part against said blow-out valve to actuate said valve.

2. For a compressed fluid plant including a fluid compressor and a compressed fluid reservoir, a pressure control device comprising a compressed fluid inlet duct leading to said reservoir, a non-return check valve in said duct, a blow-out valve in said duct ahead of said non-return valve, a part adapted to actuate said blow-out valve for opening it said part having a side recess, a spring loaded member movable on a line transverse to the path of said part in its valve-actuation motion, said member releasably engaging said part by entering said recess thereof, said member withholding said part in a location at a distance from said blow-out valve, a cylinder connected with said reservoir, a return spring loaded piston operative in said cylinder under the fluid pressure in said reservoir and cylinder and means imparting the action of said piston to said part for releasing it from said engaging member and subsequently driving said part against said blow-out valve to actuate said valve.

3. For a compressed fluid plant including a fluid compressor and a compressed fluid reservoir, a pressure control device comprising a compressed fluid inlet duct leading to said reservoir, a non-return check valve in said duct, a blow-out valve in said duct ahead of said non-return valve, a part adapted to actuate said blow-out valve said part having a side recess, a plunger movable on a line transverse to the path of said part in its valve actuation motion, means on said plunger releasably engaging said part by entering said recess thereof, a spring forcing said plunger into position for engagement of said engaging means with said part, a spring acting on said part to restore it in its position with said recess engaged by said engaging means of said plunger, a cylinder connected with said reservoir, a return spring loaded piston operative in said cylinder under the fluid pressure in said reservoir and cylinder, and means imparting the action of said piston to said part for releasing it from said engaging means and subsequently driving said part against said blow-out valve to actuate said valve.

4. For a compressed fluid plant including a fluid compressor and a compressed fluid reservoir, a pressure control device comprising a compressed fluid inlet duct leading to said reservoir, a non-return check valve in said duct, a blow-out valve in said duct ahead of said non-return valve, a part adapted to actuate said blow-out valve said part having a side recess, a plunger movable on a line transverse to the path of said part in its valve actuation motion, means on said plunger releasably engaging said part by entering said recess thereof, a spring forcing said plunger into position for engagement of said engaging means with said part, a cylinder connected with said reservoir said cylinder extending along an axis substantially parallel to the path of said actuating part, a return spring loaded piston operative in said cylinder under the fluid pressure in said reservoir and cylinder, and a pivoted lever actuated by said piston and imparting its action to said part for releasing it from said engaging means and subsequently driving said part against said blow-out valve to actuate said valve.

5. For a compressed fluid plant including a fluid compressor and a compressed fluid reservoir, a pressure control device comprising a compressed fluid inlet duct leading to said reservoir, a non-return check valve in said duct, a blow-out valve in said duct ahead of said non-return valve, a part adapted to actuate said blow-out valve said part having a side recess, a plunger movable on a line transverse to the path of said part in its valve actuation motion, means on said plunger releasably engaging said part by entering said recess thereof, a spring forcing said plunger into position for engagement of said engaging means with said part, a spring acting on said part to restore it in its position with said recess engaged by said engaging means of said plunger, a cylinder connected with said reservoir said cylinder extending along an axis substantially parallel to the path of said actuating part, a return spring loaded piston operative in said cylinder under the fluid pressure in said reservoir and cylinder, and a pivoted lever actuated by said piston and imparting its action to said part for releasing it from said engaging means and subsequently driving said part against said blow-out valve to actuate said valve.

6. For a compressed fluid plant including a fluid compressor and a compressed fluid reservoir, a pressure control device comprising a compressed fluid inlet duct leading to said reservoir, a non-return check valve in said duct, a blow-out valve in said duct ahead of said non-return valve, a finger mounted in register with said blow-out valve, a part connected with said finger and having a side recess, a plunger movable on a line transverse to the axis of said finger and part, means on said plunger releasably engaging said part by entering said recess thereof, a spring forcing said plunger into position for engagement of said engaging means with said part, a spring acting on said part to restore it in its position with said recess engaged by engaging means of said plunger, a cylinder connected with said reservoir, a return spring loaded piston operative in said cylinder under the fluid pressure in said reservoir and cylinder, and means imparting the action of said piston to said part for releasing it from said engaging means and subsequently driving said finger against said blow-out valve to actuate said valve.

7. For a compressed fluid plant including a fluid compressor and a compressed fluid reservoir, a pressure control device comprising a compressed fluid inlet duct leading to said reservoir, a non-return check valve in said duct, a blow-out valve in said duct ahead of said non-return valve, a finger mounted in register with said blow-out valve, a part connected with said finger and having a side recess, a plunger movable on a line transverse to the axis of said finger and part, means on said plunger releasably engaging said part by entering said recess thereof said means withholding said finger in a location at a distance from said blow-out valve, a spring forcing said plunger into position for engagement of said engaging means with said part, a spring acting on said part to restore it in its position with said recess engaged by said engaging means of said plunger, a cylinder connected with said reservoir, a return spring loaded piston operative in said cylinder under the fluid pressure in said reservoir and cylinder, and means imparting the action of said piston to said part for releasing it from said engaging means and subsequently driving said finger against said blow-out valve to actuate said valve.

8. For a compressed fluid plant including a fluid compressor and a compressed fluid reservoir, a pressure control device comprising a compressed fluid inlet duct leading to said reservoir, a non-return check valve in said duct, a blow-out valve in said duct ahead of said non-return valve, a finger mounted in register with said blow-out valve, a part connected with said finger and having a side recess, a plunger movable on a line transverse to the axis of said finger and part, means on said plunger releasably engaging said part by entering said recess thereof, a spring forcing said plunger into position for engagement of said engaging means with said part, a spring acting on said part to restore it in its position with said recess engaged by said engaging means of said plunger, a cylinder connected with said reservoir said cylinder extending along an axis substantially parallel to said finger, a return spring loaded piston operative in said cylinder under the fluid pressure in said reservoir and cylinder, and a pivoted lever actuated by said piston and imparting its action to said part for releasing it from said engaging means and subsequently driving said finger against said blow-out valve to actuate said valve.

GIUSEPPE ALFIERI.